LE ROY HAINES.
SHARPENER FOR DISK HARROWS.
APPLICATION FILED AUG. 8, 1918.
1,303,057.
Patented May 6, 1919.
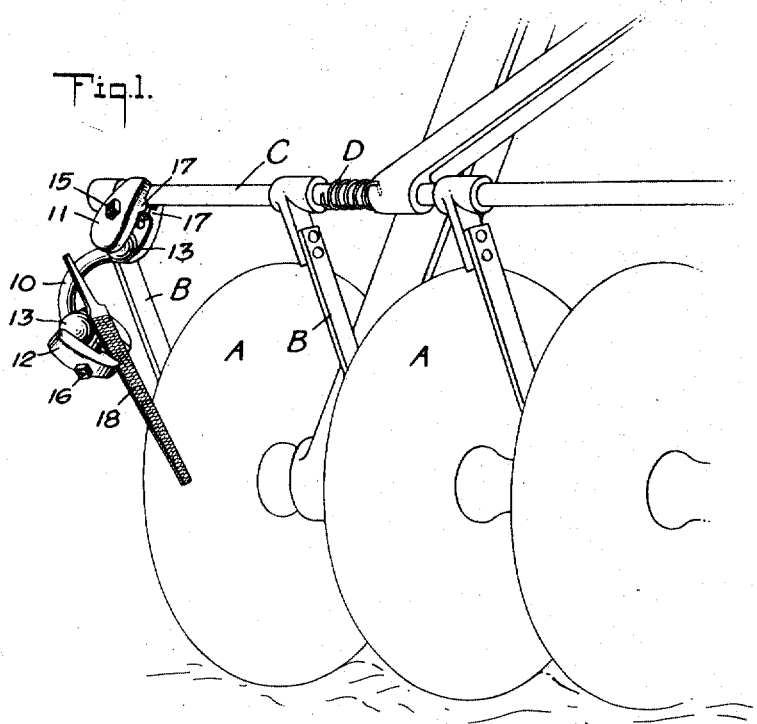
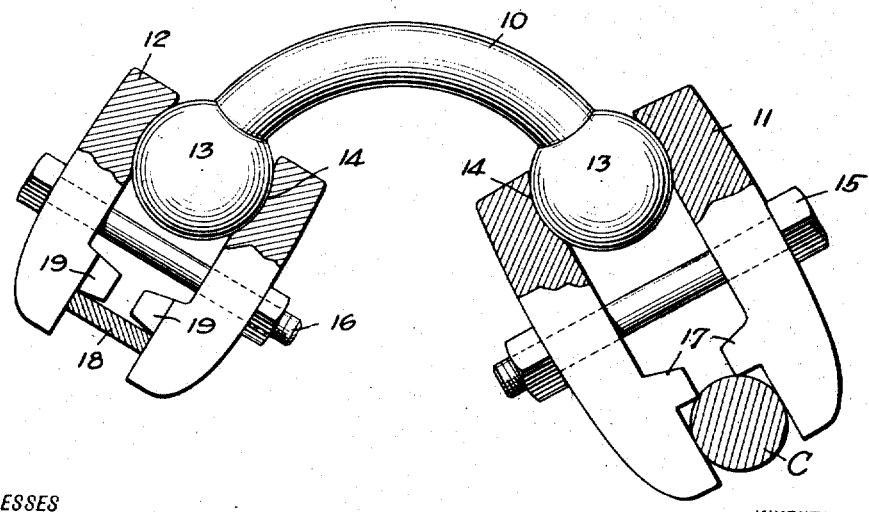
WITNESSES
INVENTOR
Le Roy Haines
BY
ATTORNEYS

UNITED STATES PATENT OFFICE.

LE ROY HAINES, OF COLCHESTER, ILLINOIS.

SHARPENER FOR DISK HARROWS.

1,303,057.      Specification of Letters Patent.      Patented May 6, 1919.

Application filed August 8, 1918. Serial No. 248,952.

*To all whom it may concern:*

Be it known that I, LE ROY HAINES, a citizen of the United States, and a resident of Colchester, in the county of McDonough and State of Illinois, have invented a new and Improved Sharpener for Disk Harrows, of which the following is a description.

My invention relates to a tool for sharpening disks, and more particularly relates to a tool to automatically sharpen harrow disks while the harrow is in operation.

An object of the invention is to provide a tool adapted to be secured at one end to the scraper bar shaft of that type of harrow in which the scraper bar shaft is subject to the tension of a torsion spring; and also to provide means to hold a file, a cutting steel, or the like, in position to be yieldingly pressed against the edge of a disk of the harrow under the tension of the scraper bar shaft and in proper angular relation to the disk so that the latter will be sharpened in the turning thereof while regularly in operation.

An important object of the invention also, is to provide in a device of the class referred to, clamping means for the sharpening medium and the scraper bar shaft and so constructed and arranged as to promote convenience and economize time and labor in applying the tool to the harrow, and in positioning the sharpening medium.

Reference is to be had to the accompanying drawings forming a part of this specification, it being understood that the drawings are merely illustrative of one example of the invention.

Figure 1 is a perspective view of a disk sharpener embodying my invention, showing the same in use on a disk harrow illustrated in part;

Fig. 2 is an enlarged side elevation of my improved device partly broken away, the view indicating in section the scraper bar shaft of the harrow and a sharpening medium in the form of a file.

In the illustration the letter A indicates disks of a harrow, mounted in the usual manner, and B, the scraper bars mounted on the scraper bar shaft C which is under the tension of a torsion spring D. My improved device includes a yoke bar 10 carrying at one end a clamp 11 adapted to be applied to the shaft C and carrying at the other end a clamp 12 for the sharpening medium. The yoke is provided at the ends with ball heads 13 and the two jaws comprised in each clamp are formed with concave seats 14 to bind against the respective heads 13 at opposite sides thereof. The clamp 11, to grip the shaft C, has a clamp bolt 15 extending transversely through the jaws so that the nut of the bolt serves to tighten up or loosen the jaws and similarly, the clamp 12 has a transverse clamp bolt 16.

The clamp 11 on the opposed faces of the jaws has lugs 17 disposed inward from that end of the clamp opposite the head 13 so that the clamp bolt passes through the jaws between the lugs 17 and the concave seats 14 and thereby serves to effect a tight clamping of the jaws 13 in rigid relation to the yoke bar 10 and tightly gripping the shaft C. The shaft therefore, as will be best seen in Fig. 2, is accommodated between the jaws outward of the lugs 17 which are pressed against the shaft in positioning the clamp on said shaft. On the jaws of the clamp 12 at the opposite end from the clamp of the seats 14 are formed lugs 19 which it will be observed, are inward from the ends of the jaws and also within the side surfaces of the jaws, whereby the jaws accommodate a rasp 18, a cutting steel, or like sharpening medium, the lugs serving to position the sharpening medium 18 and also as a resistance thereto under the sharpening pressure.

In practice the shaft C is turned to take up the slack of the spring D thereof and the clamp 11 is secured to the shaft at the proper angle so that the sharpening device will be subject to the tension of the shaft. With the sharpening medium 18 given the proper angle relatively to the edge of a disk A, the tension of the shaft C will maintain said sharpening medium yieldingly against the disk irrespective of the deviation of the latter from its general plane of revolution in the operation of the harrow. Thus, the tension of the scraper bar shaft is utilized to maintain the proper contact of the sharpening medium with the disk while the clamps are capable of individual adjustment to vary their angular positions on the yoke for the proper positioning of the tool.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A tool for sharpening disk harrows, including a yoke bar having ball heads at its ends, a pair of clamp jaws having seats in the opposite faces thereof near one end to bear on one of said heads at opposite sides thereof, lugs on the opposed faces of said jaws inward from the ends thereof and inward from the side surfaces of the jaws against which lugs a sharpening medium may be placed and be accommodated between the ends of the jaws, a clamp bolt transverse to the jaws between said seats and said lugs to jointly bind the jaws on the adjacent head of the yoke and on the sharpening medium, a second pair of clamp jaws having seats on opposed faces thereof to engage the ball on the opposite end of the yoke, and a clamp bolt for said second pair of jaws, the latter jaws having lugs on the opposite faces between the ends of the jaws and the bolt of the latter to bear against the scraper shaft of a harrow, said bolt being adapted to clamp the jaws on the scraper shaft and against the adjacent head of the yoke bar.

2. A tool for use in sharpening disk harrows, including a clamp adapted to hold a sharpening medium, a carrier bar shaped to present flaring ends on one of which said clamp is secured to permit a universal adjustment, and a second clamp on the opposite end of said carrier bar and adapted to engage the scraper bar shaft of a disk harrow to subject the tool to the tension of said shaft, the clamps being carried on said bar in angular relation to each other and said carrier bar and clamps having an effective total length such that the sharpening medium in the first mentioned clamp may be disposed against and at an angle to a disk of the harrow and be subject to pressure under the tension of said scraper bar.

3. A tool for use in sharpening disk harrows including a yoke having ball heads at its ends, clamp jaws having seats near one end thereof to bind against one of said heads at opposite sides thereof, lugs on the opposed faces of the jaws inward from the opposite ends thereof, and inward from the side surfaces of said jaws against which lugs a sharpening medium may be placed, a clamp bolt transverse to the jaws between said seats and said lugs, a second pair of clamp jaws adapted to bind on the opposite head of said yoke, and a clamp bolt for said second pair of jaws, the latter jaws having lugs on the opposite faces between the ends of the jaws and the bolt.

LE ROY HAINES.

Copies of this patent may be obtained for five cents each, by addressing the "Commissioner of Patents, Washington, D. C."